(12) United States Patent
Hawley (10) Patent No.: US 7,169,340 B2
(45) Date of Patent: Jan. 30, 2007

(54) RESIN AND FIBER COMPOUNDING PROCESS FOR MOLDING OPERATIONS

(76) Inventor: Ronald C. Hawley, Route 4, Box 289, Winona, MN (US) 55987

( * ) Notice: Subject to any disclaimer, the term of this patent is extended or adjusted under 35 U.S.C. 154(b) by 104 days.

(21) Appl. No.: 10/693,414

(22) Filed: Oct. 24, 2003

(65) Prior Publication Data

US 2004/0124556 A1 Jul. 1, 2004

Related U.S. Application Data

(60) Continuation of application No. 09/766,355, filed on Jan. 19, 2001, now Pat. No. 6,676,864, which is a division of application No. 09/286,778, filed on Apr. 6, 1999, now Pat. No. 6,186,769.

(51) Int. Cl.
*B29C 70/16* (2006.01)
(52) U.S. Cl. .................................................. 264/136
(58) Field of Classification Search .................. 264/136
See application file for complete search history.

(56) References Cited

U.S. PATENT DOCUMENTS

| | | |
|---|---|---|
| 3,042,570 A | 7/1962 | Bradt |
| 3,467,739 A | 9/1969 | Underwood et al. |
| 3,520,027 A | 7/1970 | Amos et al. |
| 3,676,095 A | 7/1972 | Stalego |
| 3,752,614 A | 8/1973 | Bremer |
| 3,760,673 A | 9/1973 | Peterson, Jr. |
| 3,804,570 A | 4/1974 | Hoschele et al. |
| 4,406,196 A | 9/1983 | Roncato et al. |
| 4,616,989 A | 10/1986 | Mewes et al. |
| 4,708,623 A | 11/1987 | Aoki et al. |
| 4,728,275 A | 3/1988 | Dilullo et al. |

(Continued)

FOREIGN PATENT DOCUMENTS

CA 1177614 11/1984

(Continued)

OTHER PUBLICATIONS

Plastics Technology, Jan. 2001, "Keeping-Up with Injection Molding".

*Primary Examiner*—Christina Johnson
*Assistant Examiner*—Monica A Huson
(74) *Attorney, Agent, or Firm*—Moore & Hansen, PLLP; Robert C. Freed (57) ABSTRACT

Molding material consisting of resin coated reinforcing fibers in a molten mass of resin and fibers is prepared at a molding site for controlled supply to a molding machine. A conveying device, such as a pair of pinch rollers, serves to pull fibers from supply spools through guide orifices of a coating die having a chamber within which the fiber is coated with molten resin. Further impregnation of the fibers with resin takes place in the conveying device, which also develops pressure on its output side serving to push the mass of hot resin and fiber into a receiving device for movement to a molding machine. The receiving device may be the feed screw for an injection molding machine or simply a plate movable to and from a compression molding machine. The fibers may be cut into predetermined lengths by a cutting device positioned downstream of the aforesaid conveying device.

10 Claims, 3 Drawing Sheets

U.S. PATENT DOCUMENTS

| | | |
|---|---|---|
| RE32,772 E | 10/1988 | Hawley |
| 4,806,298 A | 2/1989 | Wilkinson et al. |
| 4,937,028 A | 6/1990 | Glemet et al. |
| 5,110,275 A | 5/1992 | Scheuring |
| 5,165,941 A | 11/1992 | Hawley |
| 5,185,117 A | 2/1993 | Hawley |
| 5,191,819 A | 3/1993 | Hoshi |
| 5,268,050 A * | 12/1993 | Azari .................. 156/180 |
| 5,433,419 A * | 7/1995 | Murakami ............. 264/136 |
| 5,474,036 A | 12/1995 | Hansen et al. |
| 5,529,652 A | 6/1996 | Asai et al. |
| 5,540,797 A | 7/1996 | Wilson |
| 5,571,326 A | 11/1996 | Boissonnat et al. |
| 5,653,534 A | 8/1997 | Matsumoto et al. |
| 5,658,601 A | 8/1997 | Hoshi |
| 5,843,231 A | 12/1998 | Spencer et al. |
| 5,873,941 A | 2/1999 | Milliman |
| 5,879,602 A | 3/1999 | Scheuring |
| 5,989,009 A | 11/1999 | Matsuo |
| 6,090,319 A | 7/2000 | Sharma et al. |
| 6,186,769 B1 | 2/2001 | Hawley |
| 6,221,293 B1 * | 4/2001 | Brussel et al. .............. 264/136 |
| 6,241,498 B1 | 6/2001 | Hansen et al. |
| 6,247,389 B1 | 6/2001 | Samuels et al. |
| 6,431,847 B1 | 8/2002 | Hawley et al. |
| 6,604,929 B2 | 8/2003 | Hawley et al. |

FOREIGN PATENT DOCUMENTS

| | | |
|---|---|---|
| DE | 1151964 | 7/1963 |
| DE | 4016784 A1 | 11/1991 |
| DE | 19523490 A1 | 1/1997 |
| EP | 0432427 A1 | 6/1991 |
| EP | 0694378 A2 | 1/1996 |
| JP | 63-147622 A | 6/1988 |
| JP | 61-40850 A | 5/1994 |
| WO | WO 86/00568 | 1/1986 |
| WO | WO 01/54877 A1 | 8/2001 |
| WO | WO 02/02293 A1 | 1/2002 |
| WO | WO 03/016002 A1 | 2/2003 |

* cited by examiner

RESIN AND FIBER COMPOUNDING PROCESS FOR MOLDING OPERATIONS

CROSS REFERENCES TO RELATED APPLICATIONS

This Application is a continuation of U.S. patent application Ser. No. 09/766,355, filed on Jan. 19, 2001 now U.S. Pat. No. 6,676,864, which is a Division of U.S. patent application Ser. No. 09/286,778, filed Apr. 6, 1999, now U.S. Pat. No. 6,186,769, issued on Feb. 13, 2001.

FIELD OF USE

This invention relates generally to the field of mixing or compounding reinforcing fibers with thermoplastic resin. The fibers may be of any predetermined length and are introduced into admixture with thermoplastic resins for immediate use in molding machines at a product molding facility.

BACKGROUND OF THE INVENTION

Processes are known for combining reinforcing fibers with thermoplastic resin to form reinforced plastic composites. U.S. Pat. Nos. 4,439,387 and Re. No. 32,772 sharing common inventorship herewith disclose the embedding of thermoplastic resin in reinforcing fibers as they are drawn through a forming die having a convoluted passage, in the presence of molten thermoplastic resin introduced from an extruder. The extrusion product of that process comprises an elongated bar or rod having a continuous length of reinforcing fiber encased within thermoplastic resin. That preformed composite may be inserted into a die of an injection molding machine, and utilized as an insert in a compound, composite product comprising an additional layer of thermoplastic resin molded over the insert. It is also known to cut the extrudate rod from the aforesaid forming die into short lengths for use as molding pellets. In the process of the aforesaid United States patents, the extruded rod comprising a fiber/resin composite is immediately cooled, prior to final forming and cutting to desired lengths.

U.S. Pat. No. 5,185,117, also having identity of inventorship herewith, discloses a process for compounding thermoplastic resin and fibers in an extruding compounder. According to the process of that patent, melted thermoplastic resin is introduced into the compounding extruder along with reinforcing fibers. The resulting extrudate consists of a molten mass of thermoplastic resin having discrete lengths of fibers randomly dispersed therein. This hot mixture may then be fed directly into a preform device to produce a measured preform for use in a compression molding machine. In the disclosed process of the >117 patent, the fibers are precut to desired lengths, before being introduced into the extruding compounder. The process and apparatus further requires a loss-in-weight scale to accurately measure predetermined quantities by weight of reinforcing fibers to be controllably introduced into the compounding extruder in the presence of thermoplastic resin. A separate loss-in-weight feed scale assembly is required to accurately convey predetermined amounts by weight of the thermoplastic resin into the compounding extruder for mixing in the desired proportions with the reinforcing fibers. The loss-in-weight scales necessarily add to the cost and complexity of the compounding apparatus.

U.S. Pat. No. 4,616,989 discloses an apparatus for incorporating glass fibers into thermoplastic resins in which a premixing chamber is utilized to initially mix glass fibers with molten resin. This mixture is then fed into a two-stage screw-type extruder to complete the mixing of the fibers and resin. The resin-fiber mass as discharged from the final extruder is passed through a forming die having a plurality of orifices. This serves to form the material into elongated filaments of glass fiber reinforced resin, which are then cooled, and then granulated for use as a molding compound.

U.S. Pat. No. 2,877,501 to Brandt discloses a process for forming granules comprised of glass fibers coated with a molding plastic, which are intended for use as feed stock for an injection molding machine. In the Brandt process, fibers are pulled through an orifice within which they are coated with a resin material.

None of the known prior art processes for formulating a mixture of fiber reinforced resin for molding purposes are operatively effective for preparing a molding material comprised of fiber reinforced resin for immediate introduction into a molding machine at the same site where the fiber-resin mixture is made. Either cumbersome and costly apparatus, including multiple stage mixing devices and loss-in-weight scales, are required in the prior processes, and/or the fiber-reinforced resin is extruded into lengths, cut and packaged for sale and transportation to separate molding facilities.

There thus exists a need for a compact, efficient apparatus and process for accurately formulating mixtures of fiber and resin and thereafter directly introducing that molding material directly into a molding machine, such as an injection molding machine, a compression molding press, a transfer mold, a blow mold, a profile extrusion machine or an inject compression molding machine.

BRIEF SUMMARY OF THE INVENTION

This invention has as its primary objective the provision of a process and apparatus for interspersing fibers in a thermoplastic resin in a desired weight ratio, under a controlled, fiber-coating process, and thereafter introducing the coated fibers directly into a molding machine at the same site, without cooling of the fiber-resin mixture.

This basic objective is realized by conveying at least one fiber strand through a die chamber in the presence of molten thermoplastic resin, thereby coating the fiber strand with the resin; and thereafter directly introducing the resin-coated fiber strand in a heated state into a receiver for movement into a molding machine. The receiver may comprise an extruder barrel that houses a rotatable screw or simply a plate or tray utilized to convey a pliant mass of resin and fiber into the mold press of a compression molding machine.

The fiber strand may be cut into predetermined lengths to form a hot molten mixture of resin and fibers for use in a molding machine.

The molding machine may comprise any type of molding apparatus, such as an injection molder or a compression molder. In the former case, the aforesaid extruder comprises the barrel containing a rotatable screw serving as the in-feed device for forcing molding material into the mold cavity of an injection molding machine. In this embodiment, the coated fiber strands are conveyed directly into the barrel of the in-feed extruder after being coated.

Alternatively, the extruder into which the coated fiber strand is introduced may comprise a compounding extruder as disclosed in the aforesaid U.S. Pat. No. 5,185,117. The final impregnating and wetting of the fibers by the resin takes place in that compounding extruder. As disclosed in U.S. Pat. No. 5,185,117, the molten mass of thermoplastic resin and fibers discharged from the compounding extruder may be preformed into a pliable mass which is conveyed to the mold press of a compression molding machine at the same site.

In both of the aforesaid embodiments, the final wetting and impregnating of the fibers with thermoplastic resin takes place in the screw barrel of the extruder into which the coated fiber strands are introduced.

As a particularly advantageous feature, a mechanical conveying device is utilized to pull either a single fiber strand or multiple strands of fibers through a coating die as described above, into which molten thermoplastic resin is introduced from a separate extruder. The same conveying device serves to push the coated fibers into a receiving device as stated above, such as the barrel housing an extruder screw for subsequent injection or compression molding.

In the preferred embodiment, a cutting device is provided at the output site of the conveying device. The coated fiber strand(s) is cut into a plurality of predetermined lengths at the discharge side of the conveying device to thereby form a hot molten mixture of resin and fibers for use in a molding machine. The conveying device generates pressure which serves to push that hot molten mixture of resin and fibers into the barrel of a screw-type extruder as described above.

The conveying device may comprise a mechanical pump in the form of a pair of cooperating screws having impeller blades which grip the fiber strand and pull it through the coating chamber and thereafter push it into the extruder barrel. Alternatively, the pump may comprise a gear pump having a pair of cooperating gears with intermeshing teeth; or, the pump may comprise cooperating rollers defining a nip therebetween within which the fiber strand is gripped and pulled through the coating chamber and thereafter pushed through the output side or port of the pump into the extruder barrel.

The aforesaid coating chamber may advantageously comprise one or more orifices of a predetermined size larger in cross-sectional area than the cross-sectional area of the fiber strands to be coated. Multiple fiber strands may be passed through such orifices, with the annular space between the strand and each orifice permitting the predetermined amount of molten resin to pass through with the fiber, by means of which the amount of resin coating each fiber strand may be controlled. The fiber strands will normally comprise bundles made up of a plurality of fine fiber filaments.

In any of the aforesaid embodiments, the fiber is caused to be heated by admixture with the molten resin in the coating chamber, with the fiber being further heated by the mechanical pumping action of the conveying device. The coated fiber is forced into the extruder barrel or onto a transport receiver in a heated state substantially immediately after being discharged from the conveying device.

The aforesaid apparatus and process may be controlled in coordination with the operation of an extruder into which the coated fibers are introduced for direct molding. In applications where the extruder screw comprises the in-feed screw of an injection molding machine, that screw is intermittently actuated to intermittently feed charges of molding material into the injection mold. The aforesaid conveying device, in whichever form of mechanical pump is utilized, is also intermittently actuated in synchronization with the intermittent operation of the rotatable screw of the in-feed extruder to the injection molding apparatus. This ensures that the supply of fibers and resin in a molten mass is accurately fed into the barrel of the extruding screw, only when that extruding screw is rotating to receive such material and convey it forwardly toward its discharge end. No fiber and resin mix is fed into the extruder barrel when it is operating during the in-feed phase of its cycle in which it is conveying a charge of fiber and resin molding material into the molding chamber of the injection molding machine.

As a further control feature, the screw of the extruder utilized to supply a molten thermoplastic resin to the coating chamber may also be intermittently actuated in coordination with the intermittent rotational operation of the screw housed within the barrel into which the resin-coated fiber is directed.

These and other objects and advantages of the invention will become readily apparent as the following description is read in conjunction with the accompanying drawings wherein like reference numerals have been utilized to identify like elements throughout the several views.

DESCRIPTION OF THE PREFERRED EMBODIMENTS

Figures 1, 4:
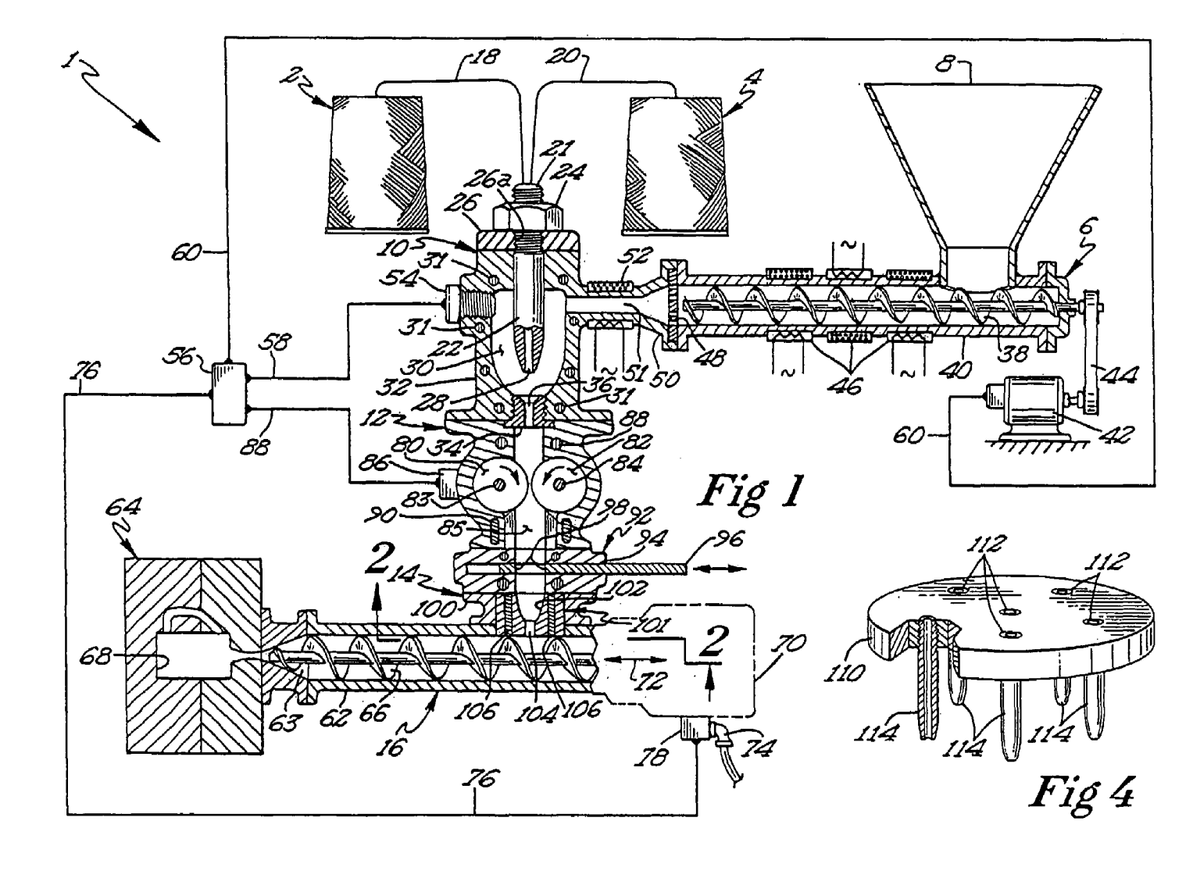
FIG. 1 is a showing in vertical section of the apparatus and process of this invention with respect to one embodiment.
FIG. 4 is a perspective view of an orifice plate assembly which may be utilized to feed multiple strands of fiber into a coating chamber.

Referring now to the drawings, there is shown in FIG. 1 an embodiment illustrating the apparatus and process of this invention for preparing fiber reinforced resin as a molding charge. The apparatus or system is comprised of spools or rolls of fiber 2, 4, a resin supply extruder 6 having a feed hopper 8, a coating die 10, a fiber and resin conveying device 12, a transition nozzle assembly 14, and a receiving device generally indicated by reference numeral 16. Reinforcing fibers, such as glass fiber, is supplied from spools or supply rolls 2 and 4 in the form of strands 18 and 20. Each of the strands 18 and 20 actually comprises a bundle of very fine fiber filaments, with as many as several thousand filaments per bundle. Those fine filaments have diameters which may range from 10 to 25 microns, by way of example. The fiber strands or bundles may comprise, other than glass fibers, carbon-graphite fiber or Kevlar7 fibers. The use of two supply fiber strands 18 and 20 facilitates splicing the ends of those fibers together, in the event that one of the fiber spools 2 or 4 should become exhausted. The fiber strands 18 and 20 are directed into a single guide nozzle 22 having a threaded end 21 secured in place by a nut 24 on top of coating die 10. An orifice plate 26 is mounted on top of coating die 10, and is provided with an orifice 26*a* through which guide nozzle 22 extends. As is hereinafter set forth, orifice plate 26 may have any number of orifices or ports to receive multiple nozzles 22, and thus to guide multiple strands of fiber 18, 20 into coating die 10. Nozzle 22 has a passage 28 extending therethrough for passage of the fiber into chamber 30 formed within housing 32 of coating die 10.

Housing 32 of coating chamber 10 is provided at its outlet side with an outlet orifice plate 34 having an orifice 36 of predetermined size. As is hereinafter set forth, orifice 36 has a predetermined diameter which will accommodate the fiber strand and a coating of thermoplastic resin thereon.

Thermoplastic resin, preferably in the form of pellets, is provided to resin supply extruder 6 from a feed hopper 8. The resin may be any of a variety of acceptable thermoplastic resins for the product purpose intended, such as polypropylene, nylon, polyurethane, and polyesters. A feed screw 38 is rotatably mounted within housing or barrel 40 of extruder 6, for rotational driving movement by motor 42. Any conventional drive arrangement, such as the belt 44, may be utilized for transmitting driving power from motor 42 to extruder screw 38. A plurality of electric heaters 46 may be utilized in a conventional manner to heat the resin being propelled through extruder barrel 40.

An orifice or breaker plate 48 is also preferably utilized at the output end of extruder barrel 40. That plate is provided with a plurality of orifices to control the flow of molten thermoplastic resin from extruder barrel 40 into an adapter connector 50 having an internal flow passage 51. An additional electric heater 52 may be provided on adapter 50 to maintain the resin in a molten state at a predetermined temperature as it enters chamber 30 of coating die 10.

Additional electric heating elements 31 are also provided as necessary in the housing 32 of coating die 10 to insure that the molten resin stays heated at a predetermined temperature as it coats fibers 18, 20 being conveyed through guide nozzle 22 in chamber 30.

A pressure transducer 54 is preferably threadedly inserted into housing 32 of coating die 10 to sense the pressure therein. A microprocessor type of controller 56 is incorporated in a control system for operational control of various components of the system as hereinafter set forth. Lead 58 from pressure sensor 54 is connected to microprocessor 56, with lead 60 being connected therefrom to drive motor 42 for resin supply extruder 6.

Coupled to the output side of coating die 10 is a conveyor device 12 which is preferably utilized for pulling the fiber strands 18, 20 through coating chamber 30 of coating die 10 and ultimately pushing the mass of fiber and thermoplastic resin into a receptacle or receiving device 16. As shown in FIG. 1, the receiving device 16 may advantageously comprise the barrel 62 of the feed extruder to an injection molding machine 64. A feed screw 66 is rotatably and reciprocally mounted within barrel 62 for feeding charges of resin and fiber molding material into the molding cavity 68 of injection molding machine 64. The feed screw 66 is driven by a standard power unit generally indicated by reference numeral 70 of known design for imparting rotational motion, as well as reciprocal linear movement to screw 66. The arrow 72 indicates the reciprocal path of molding material feed screw 66. Power is supplied to drive unit 70 at a connection 74; and a control lead 76 is connected from an electrical current sensor 78 on the power line to power unit 70 to microprocessor control 56. Current sensor 78 may be of a known design of the induction type.

Various types of conveying devices or mechanisms may be utilized for conveying device 12. In the embodiment shown on FIG. 1, the conveying device comprises a pair of rotatably mounted and driven pinch rollers 80, 82 which rotate toward each other as indicated by the directional arrows. Those rollers are mounted on shafts as shown, and driven by a motor and transmission mechanism of any suitable type. For example, a drive motor may be connected to one of the pinch roller shafts 83, with the other shaft 84 being driven by a chain or belt transmission device. The drive motor for the pinch rollers 80, 82 is controlled through a power supply 86, having a control lead 88 which is also connected to microprocessor 56.

In order to insure that the mixture of resin and fibers is maintained at the desired high temperature level during the coating within chamber 30, as well as during the conveying through device 12 and into the receiver 16, multiple heating elements are utilized. Additional heating elements 31 are provided within the housing of coating device 10; and heating elements or cartridges 88 and 90 are provided within the housing of conveying device 12.

In the preferred embodiment, the coated fiber being discharged from conveying device 12 is cut into discontinuous, predetermined lengths. This may be done in several ways. It is contemplated that coated fibers discharging from conveying device 12 may be pushed directly into barrel 62 of the feed screw 66 for injection molding machine 64. The rotational action of screw 16 in the close tolerance fit with the inside surface of barrel 62 will cut the fiber into lengths. It is also contemplated that the coated fibers may be fed into a compounding extruder of the type disclosed and identified by reference numeral 8 in U.S. Pat. No. 5,185,117. Whether the receiving extruder is the feed screw for an injection molding machine, or a compounding extruder as disclosed in U.S. Pat. No. 5,185,117, the final dispersement, impregnating and wetting of the fibers by the resin takes place within the barrel of the extruder.

Alternatively, and in the preferable mode, the coated fiber strands discharging from conveying device 12 are cut into predetermined lengths by a cutting device 92 positioned downstream of the discharge port 85 for conveying device 12. For that purpose, cutting device 92 comprises a housing 94 apertured as shown to receive coated fiber from discharge port 85. Housing 92 is slotted to slidably receive a cutting blade 96. Blade 96 is connected to a suitable power source (not shown) of known design for imparting reciprocal linear motion to it. The directional arrow on blade 96 indicates such reciprocal movement. Blade 96 has an inner aperture defined as shown by cutting edges 98. It will thus be seen that as blade 96 reciprocates laterally, with the fiber material discharging from conveying device 12 through port 85 passing through the blade aperture, the cutting edges 98 will alternately and intermittently cut the fiber. The speed of blade 96 is controlled so as to provide fiber of predetermined lengths.

Downstream of cutting knife assembly 92, a transition nozzle assembly 14 is provided for the controlled feeding of a hot molten mixture of resin and fibers into receiver 16. As described above, with respect to FIG. 1, that receiver comprises the barrel 62 of an in-feed extruder for injection molding machine 64. The nozzle assembly is comprised of an apertured housing 100 which serves as a transition piece between knife housing 94 and extruder barrel 62. Contained within housing 100 is a nozzle 101 having a flow passage 102 to receive coated and cut fibers discharging from cutting knife housing 94. Flow passage 102 preferably is contoured to a tapered shape as shown to provide flow communication with a discharge orifice 104 of predetermined size. Orifice 104 provides a flow restriction to the passage of the mass of coated fibers being pushed out of discharge port 85 of conveying device 12. The mass of coated fibers is forced through orifice 104 into the barrel 62 of receiver 16.

In operation, fiber strands comprising bundles of filaments 18 and 20 are pulled from supply spools 2 and 4 into guide nozzle 22 of coating chamber 30 of the coating die 10. Molten, melted and fluid thermoplastic resin is forced by extruder feed screw 38 through orifice plate 48 into adapter connector 50, from which the molten resin flows into chamber 30 of coating die housing 32. The controlled operation of heaters 46 and 52 insures that the thermoplastic resin is maintained at a desired high temperature in a fluid state.

The moving bundle of glass fibers exiting from the tip of fiber passage 28 within nozzle 22 will collect some of the thermoplastic resin, which will adhere to the fibers and move with the fiber bundle, downwardly through mixing chamber 30. This coated fiber bundle will be pulled through outlet orifice 36 of orifice plate 34 by the conveying device 12. As described above, the conveying device of the embodiment of FIG. 1 comprises a pair of rollers 80, 82, closely spaced so as to define a nip therebetween. The fiber bundle, coated with thermoplastic resin, is engaged by that nip, between the rollers and pulled through the housing of conveying device 12.

As the bundle of fibers and resin is pulled through outlet orifice 36 of the mixing chamber 30, excess resin is scraped off on the side walls of orifice 36. That orifice is of a predetermined size so as to control the resin content and ratio of resin to fiber to that required for the end product being molded. The fiber-resin ratio is expected to be in the range commonly used for reinforced thermoplastics, such as 10 percent to 60 percent glass fiber content by weight.

The pressure sensing transducer 54 located within chamber 30 of the coating die 10 regulates the speed of rotation of resin feed screw 38. This insures that the resin is fed at the desired rate compatible with the movement of fibers through guide nozzle 22, by conveying device 12. The desired predetermined weight ratio of fiber and resin is thus achieved. The multiple heating elements 31 in the walls 32 of coating die 10 are further regulated to maintain the desired high temperature within chamber 30 during the fiber coating process. Pressure transducer 54 may also be used to start and stop resin feed screw 38 as required for the batch feeding process of injection molder 64. Sufficient pressure is maintained within chamber 30 so as to maintain good intimate contact of resin with the fiber strands 18, 20. Excessive pressure is to be avoided in order to keep the molten resin from flowing out of orifice 36 in an uncontrolled manner.

It is to be noted that guide nozzle 22 is oriented so as to be in direct alignment with outlet orifice 36. This insures that the fibers will move smoothly, without interruption, through coating die 10, and into the housing of conveying device 12.

As noted above, each of the fiber strands 18 and 20 is comprised of multiple fine fiber filaments. Within chamber 30, the molten thermoplastic resin coats the outside of the fiber strand and encapsulates some of the fiber filaments on the exterior of the fiber strand.

It is to be noted that orifice plates 26 and 34 having multiple orifices can be utilized for the purpose of introducing any number of fiber strands, simultaneously, into coating die 10. FIG. 4 illustrates such an orifice plate 110 having multiple orifices 112. Such a plate 110 may be substituted for the single orifice plate 26 on the input side of housing 32 of coating die 10. Each of the orifices has threadedly inserted therein a fiber guide nozzle 114. In the embodiment shown, six such guide nozzles 114 are utilized for the six receiving orifices 112. It is to be understood that a matching orifice plate having six such outlet orifices must be substituted for orifice plate 34 at the output or discharge side of coating die chamber 30. The apertures in the outlet orifice plate will necessarily be oriented to be in exact alignment with the plurality of guide nozzles 114 so that the coated fibers will flow directly and smoothly from guide nozzles 114 into and through the outlet orifices at the bottom or output side of housing 32 of coating die 10.

The action of pinch rollers 80, 82 pushes the mass of resin coated fibers through apertured cutting knife plate 96. As noted above, that plate reciprocates at a predetermined speed so as to cut off the coated fibers in predetermined lengths, as required for the particular physical properties of the product being molded. The slower the reciprocating speed of cutting knife 96, the longer will be the length of each fiber segment which is cut. Either short or long fibers may be provided, depending upon the molding application with which the fiber coating and feed apparatus is employed. Short fibers on the order of 0.030 inches to 0.050 inches may be utilized for certain applications, whereas long fibers of at least ¼ inch in length, and extending up to one inch and greater lengths may be provided as necessary and appropriate for the molding operation.

The action of pinch rollers 80, 82 pushes the molten mass of melted resin and chopped fiber, under pressure, into the receiving device 16. In the embodiment shown in FIG. 1, that mass of molten resin and fibers is pushed through flow passage 102 and discharge orifice 104 of nozzle 101 into the interior of extruder feed barrel 62. Orifice 104 causes a back pressure within passage 102 and at the discharge side of apertured cutting knife housing 94. As a result, the cut fibers are compressed into a molten mass with the hot resin in which they are encapsulated.

As noted above, feed screw 66 for injection molder 64 is both a rotating and reciprocating device. Such alternating power movement is imparted to screw 66 by drive unit 70. Feed screw 66 rotates in order to convey the resin/fiber mix forwardly into mold charge chamber 63 at the output side of extruder barrel 62. The screw then reciprocates rearwardly in order to build up that charge of molten material in chamber 63. When the mold 64 is closed, the feed screw 66 reciprocates forwardly to inject the molten thermoplastic resin and fiber charge into mold cavity 68.

During a portion of each molding cycle, the feed screw 66 is not rotating and is not accepting material through orifice 104. Accordingly, the operation of the conveying device 12, and in particular of the pinch rollers as shown in FIG. 1, must be stopped and started. Microprocessor 56 is utilized to coordinate the intermittent operation of conveyor device 12 and feed screw 66 in controlled synchronization. For this purpose, electric current sensor 78 provides signals through control lead 76 to microprocessor 56. The microprocessor in turn intermittently starts and stops the motor drive for conveying device 12 in synchronization with the starting and stopping of feed screw 66. This insures that a fiber and resin mix is supplied to receiver 16 only when screw 66 is in an operating mode to receive that material.

Figures 2, 3, 5:
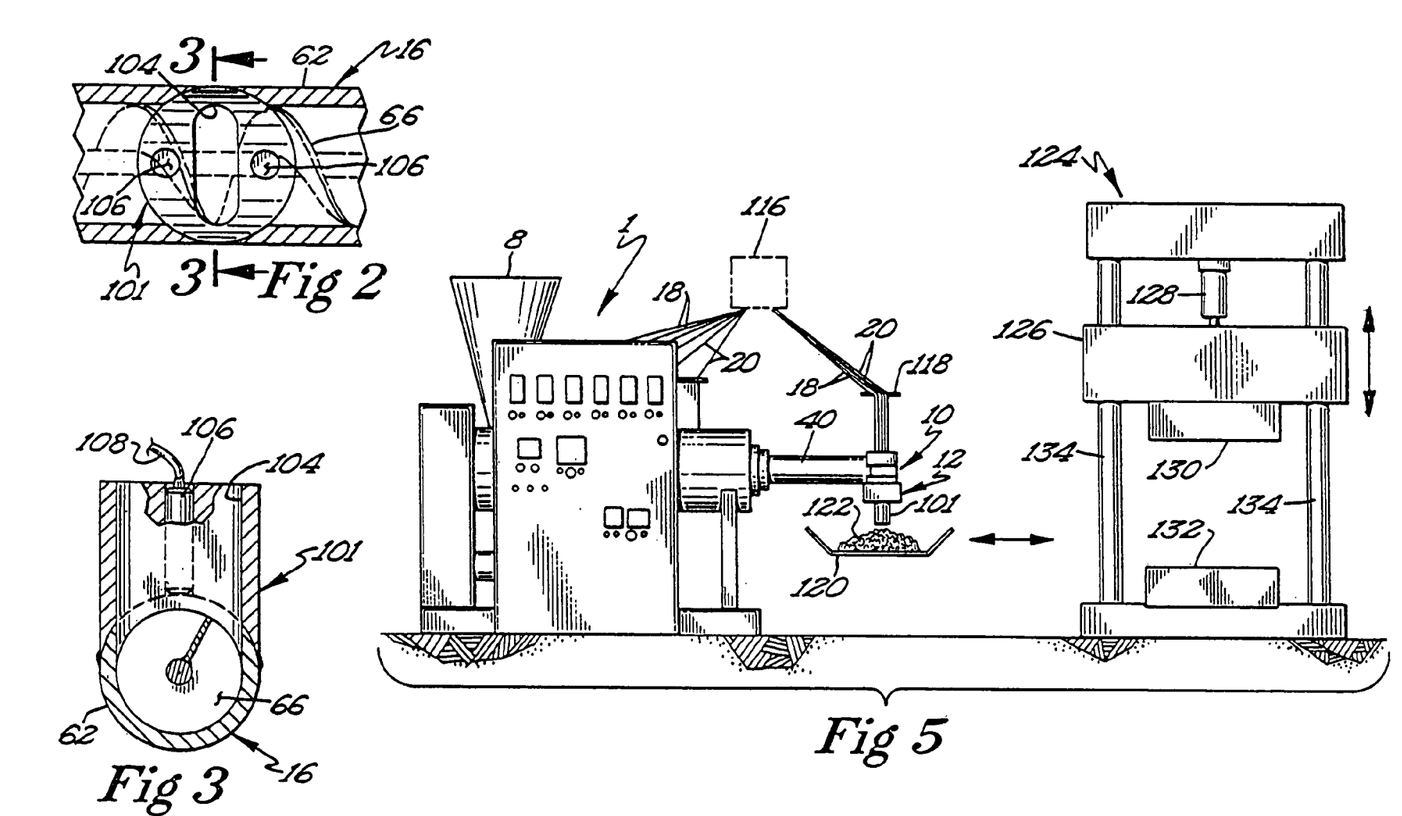
FIG. 2 is a horizontal section view of the transition nozzle at the output end of the apparatus, taken along lines 2—2 of FIG. 1.
FIG. 3 is a vertical section view of the nozzle assembly of FIG. 2, taken along lines 3—3 thereof.
FIG. 5 is a schematic illustration of one embodiment of the apparatus of this invention as utilized in a system for making a molding mix of resin and fibers for direct utilization in a compression molding machine.

It is important to note that the resin on the fiber bundle exiting from coating die 10 is not allowed to cool to a solidified, hardened state, but instead is pulled through the coating die 10, coated with molten fiber, cut and pushed into nozzle 101 in a heated state. This insures that the resin/fiber mix will be in the form of a mass of soft, pliant material to serve as a charge to be directly inputted to a molding machine. The cartridge heaters 106 having electric lead wires 108 as shown in FIGS. 2 and 3 serve to insure that the feed mix of fibers and resin does not unduly cool as it flows through nozzle 101 en route to the receiving device 16.

In that regard, it is to be noted that the mass of fiber and resin discharged through nozzle 101 by way of its orifice 104 may be received on a conveying mechanism for direct input into a compression molding machine, without further working by a feed screw of any kind. Such an operation is illustrated, partially schematically, in FIG. 5. The fiber and resin feed apparatus is generally indicated by reference numeral 1, and may be the same apparatus as indicated by reference numeral 1 in FIG. 1, and described above. Thus, the resin feed hopper 8 is shown in this side elevation view as being connected to the resin feed extruder housing 40. That feed extruder 40 is mechanically associated through adapter 50 with a fiber coating die 10, as described above. Fibers 18 and 20 may be provided from multiple spools or reels and initially drawn through a feed device 116. That device may utilize an apertured plate with ceramic eyelets to rack and orient the fibers, and to guide them without damage to a final positioning plate 118. Plate 118 has multiple ports to receive, locate and guide fibers in precise alignment with the multiple orifices or holes provided in the fiber inlet orifice plate as described above with respect to FIG. 4. A conveying device 12, such as the pinch rollers 80, 82 of FIG. 1, pulls the fibers through the coating chamber of coating die housing 10 and pushes them into and through discharge nozzle 101 of the type described above with respect to FIGS. 1, 2 and 3. Heating devices are used as described above in order to maintain the resin in a hot, molten state, and to provide a heated pliant mass of molding material 122 which is discharged from nozzle 101 onto a receiving and conveying plate 120.

In this embodiment, the fibers may be discharged in continuous lengths, in a swirl pattern onto receiving plate 120. A gate and cutting device (not shown) may be utilized across the outlet end of nozzle 101 to intermittently cut off a mass of fiber and resin as it flows out of the discharge orifice at the bottom end of nozzle 101.

Receiving device 120 may be moved back and forth between nozzle 101 and a compression molding machine generally indicated by reference numeral 124. Molding machine 124 is of a conventional type incorporating a reciprocating platen 126. Power cylinder 128 serves to reciprocate platen 126 upwardly and downwardly on guide rods 134. An upper mold head 130 is carried on platen 126, and a mating, lower mold head 132 containing a material receiving mold cavity is mounted as shown at the base of the molding machine. The charge or mass of molding material 122 is deposited intermittently into the cavity of lower mold head 122 for molding a product of predetermined shape and physical properties. For parts requiring high impact resistance, the long continuous fibers contained within the fiber/resin charge 122 are particularly beneficial.

Figures 6, 7:
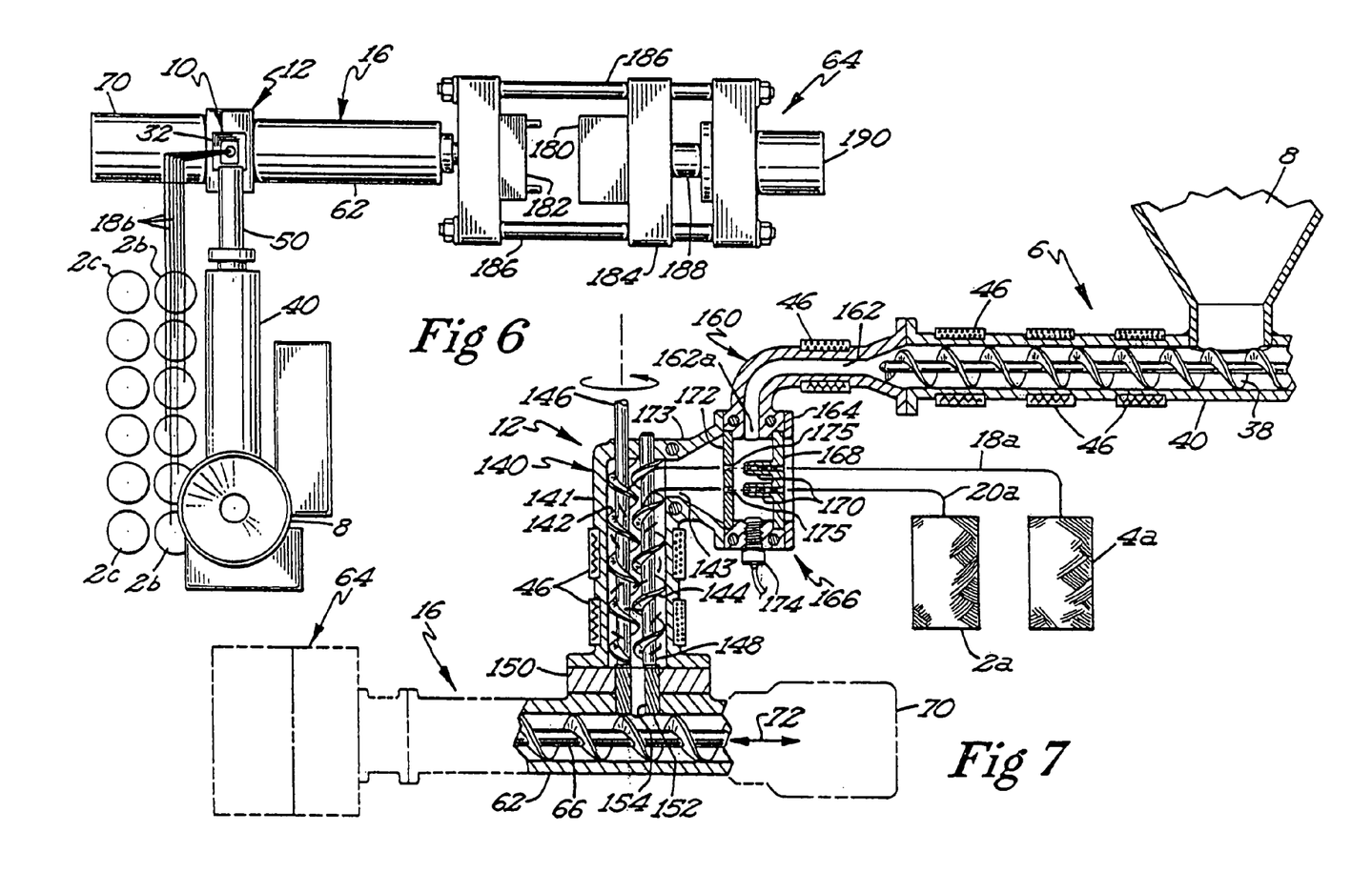
FIG. 6 is a top, plan view illustrating schematically the apparatus of FIG. 1 for use with an injection molding machine.
FIG. 7 is a vertical section view illustration of a modified version of the apparatus of FIG. 1 utilizing a screw type of conveying device for resin and fiber.

It is anticipated that the conveying device 12 as described above may take various forms of pumping devices. For example, a gear pump may be utilized in place of the nip rollers 80, 82. Alternatively, a pump of screw type construction may also be used. A conveying device of that construction is shown in FIG. 7, and is generally indicated by reference numeral 140. The screw pump or conveyor 140 has an outer housing 141 defining an inner chamber through which fiber strands are pulled after being coated by thermoplastic resin in coating die 166. The conveying device is further comprised of a pair of interacting screws 142, 144 mounted on drive shafts 146 and 148 respectively. Input rotary power may be supplied to screw shaft 146 from any type of power source. At the output side of screw pump 140, a transition plate 150 is provided to house a discharge nozzle 152 of predetermined size. Nozzle 152 has an internal flow passage 154 defining a discharge orifice at its outer end.

A resin supply extruder 6, as described above with respect to FIG. 1, may be utilized in the same way to supply molten thermoplastic resin to a coating die 166. Thus, feed screw 38 of the resin extruder is rotatably housed within a screw barrel 40 for power actuation by a drive source, not shown. The output end of extruder barrel 40 is connected to an adapter connector 160, which, for purposes of this embodiment, may have a right angle shape as shown to define an internal flow passage 162 disposed at a right angle to outlet flow passage 162a.

A fiber coating die generally indicated by reference numeral 166, and of the same general type as described above with respect to coating die 10 and its multiple orifice fiber feed plate 110 may be utilized as shown in FIG. 7. A cross-flow arrangement of thermoplastic resin with respect to fiber strands 18a and 20a is again utilized. Housing 164 of coating die 166 is shaped to contain a fiber input orifice plate 168. As shown, the input plate 168 has two orifices to receive the two fiber strands 18a and 20a from their supply spools 2a and 4a respectively. Fiber guide nozzles 170 of the same type and construction as described above with respect to nozzles 22 and 114 (FIG. 4) are mounted in the guide nozzle orifices to receive and guide the fiber strands through the coating chamber defined inside of die housing 164. An outlet orifice plate 172 is provided on the discharge side of coating die 166. As shown, that orifice plate has a pair of orifices 175 of predetermined size, which are positioned in exact alignment with guide nozzles 170 in order to receive the fiber strands being pulled through the coating die 166. A pressure sensor 174 may also be used as described above to control the speed and intermittent operation of resin delivery screw 38 in response to the predetermined resin pressure to be maintained within housing 164.

The interacting screws 142 and 144 grip the fiber strands and pull them into the conveying device 140 through its inlet opening 143. A transition segment 173 serves to guide the resin coated fiber strands into receiving opening 143 of pump housing 141. As the screws 142 and 144 rotate on their shafts 146 and 148, they grip the fiber strands and pull them through the coating die 166 into and through the housing 141. As the fiber strands 18a and 20a are pulled through the coating die 166, they are coated and embedded with molten thermoplastic resin in the manner described above with respect to FIG. 1. The interaction of the screws 142 and 144 is designed to initially pull the coated fiber strands into the screw pump chamber defined within housing 141, and then to convey the coated fiber coated strand(s) toward the discharge end of the screw pump defined by transition plate 150. During this pumping and conveying action of the twin screw conveyor, the fiber will be cut into discontinuous lengths by the screw blades 142 and 144. These chopped coated fiber segments are then conveyed to the nozzle 152 at the discharge side of the screw pump. The mass of fiber and resin material builds up pressure as it is pushed by the twin screws into and through the restriction provided by nozzle flow passage 154. The material thus becomes a mass of thermoplastic resin and chopped fiber, which is pushed under pressure into and through nozzle 152. Transition plate 150 and nozzle 152 are constructed and arranged as shown in FIG. 7 in the side wall of the barrel or housing 62 for mold feed screw 66, as shown in FIG. 7. The mass of pressurized fiber and resin is thus pushed by the pumping device 12, in the form of the twin screws, into the interior of extruder barrel 62. Thereafter, the rotating and reciprocating action of screw 66 forces the fiber and resin charge into mold cavity 68 of an injection molding machine 64 in the same manner as described above with respect to FIG. 1.

The driving operation of screws 142 and 144, as well as that of resin feed extruder screw 38, may be controlled by a microprocessor in synchronization with the operating action of mold charge feed screw 66 as described above with respect to microprocessor 56.

FIG. 6 illustrates in a top, plan view the combination of the fiber and resin feed and mixing apparatus as shown and described with respect to FIG. 1 with an injection molding machine 64. A plurality of spools or rolls 2b are shown as supplying strands of fiber 18b to the housing of a coating die 10. A reserve supply of fiber spools 2c is also illustrated. As spools 2b are exhausted, fibers are then supplied from the reserve spools 2c.

The coating die 10 may preferably utilize a multiple orifice guide plate 110 as shown and described with respect to FIG. 4. The multiple fibers 18b are directed into the orifices 112 of such a plate, and guided by nozzles 114 extending therethrough as shown and described with respect to FIGS. 1 and 4. The conveying device or resin/fiber pump is designated by reference numeral 12. As stated above, such a pump may comprise the pinch rollers 80, 82 of FIG. 1, the twin screw pump 140 of FIG. 7, a gear pump or other type of mechanism for imparting movement to the fiber and resin. The barrel or housing 62 contains the mold material feed screw 66 as shown and illustrated with respect to FIGS. 1 and 7. By virtue of that in-feed device, the mix of hot resin and fiber is fed to the injection mold cavity defined by mold clamps or halves 180 and 182. A conventional injection molding machine is illustrated by reference numeral 64, and incorporates a platen 184 on which mold half 180 is mounted for sliding movement on guide rails 186. The piston 188 of a power cylinder 190 serves to provide the controlled opening and closing action of the mold halves 180 and 182 by reciprocating movement of mold half 180.

The utilization of a fiber and resin coating, conveying and mixing apparatus as described herein, in direct association with a molding machine as illustrated by way of example in FIGS. 5 and 6, at a molding site provides particular advantages of economy and molding operation. There is no need to receive and store preformed molding pellets of fiber reinforced resin at the molding machine site. Rather, the molding material comprised of fibers cut to a predetermined length and coated and encapsulated in thermoplastic resin is prepared at the site and fed to the molding machine as part of a continuous molding operation. Advantageously, the fibers may be supplied in the desired length and in the desired weight ratio to the resin in order to achieve the particular physical properties desired in the product being molded. Maximum flexibility of molding operations for different applications is thus achieved.

It is anticipated that various changes and modifications may be made in the apparatus and process described herein, without departing from the spirit and scope of the invention as defined by the following claims. For example, it is anticipated that impellers or pumping devices other than those described herein with respect to conveying device 12 may be utilized to satisfactorily pull and push coated fiber strands through a coating die and into a receiving device. Also, in addition to the types of molding apparatus described above, the apparatus and process of this invention may be used with profile extruding equipment. In such an application, the hot resin and fiber mixture would be fed from nozzle 101 or 152 into the extruder feeding the extrusion die of a profile extruder as used to make, e.g., plastic pipe.

What is claimed is:

1. A process for preparing fiber-reinforced resin for use in molding machines comprising:

threading at least one fiber strand through a chamber; and
intermittently introducing into the chamber thermoplastic resin in a molten state, and thereby coating the fiber strand with thermoplastic resin;
pushing the resin coated fiber strand in a heated state into a barrel housing a rotatable screw simultaneously with the introduction of thermoplastic resin into the chamber and independently of the action of the screw;
wherein the fiber strand is cut into predetermined lengths after being coated and prior to being directed into a barrel housing a rotatable screw.

2. The process of claim 1, wherein
the rotatable screw is a feed screw of an injection-molding machine.

3. The process of claim 1, for use in a compression molding machine.

4. The process of claim 2, wherein
the fibers are cut by the feed screw inside of the barrel.

5. The process of claim 1, wherein
the barrel rotatable and screw include a compounding extruder in which the fiber and resin are thoroughly mixed into a molten mass.

6. The process of claim 5, further including
shaping the molten mass from the compounding extruder into a compressible shape and thereafter conveying the shaped mass to a molding machine adjacent to the compounding extruder.

7. The process of claim 6 wherein the molding machine is a compression-molding machine.

8. The process of claim 6 wherein said molding machine is a transfer-molding machine.

9. The process of claim 1, wherein the rotatable screw is the feed screw of a profile-extruding machine.

10. A process for preparing fiber-reinforced resin for use in molding machines comprising:

passing a fiber strand through a chamber;
intermittently introducing into the chamber a thermoplastic resin in a molten state, and thereby coating the fiber strand with thermoplastic resin; and
pushing the resin coated fiber strand in a heated state into a fluidic conveying mechanism in conjunction with the introduction of thermoplastic resin into the chamber and independently of the action of the fluidic conveying mechanism;
wherein the fiber strand is cut into predetermined lengths after being coated and prior to being directed into the fluidic conveying mechanism.

* * * * *